United States Patent [19]

Tsukada

[11] Patent Number: 5,087,130
[45] Date of Patent: Feb. 11, 1992

[54] UNDER SEAL DEVICE OF LINEAR MOVEMENT GUIDE BEARING

[75] Inventor: Toru Tsukada, Maebashi, Japan

[73] Assignee: Nippon Seiko Kabushiki Kaisha, Tokyo, Japan

[21] Appl. No.: 672,338

[22] Filed: Mar. 20, 1991

[30] Foreign Application Priority Data

Mar. 20, 1990 [JP] Japan .................. 2-28403[U]
Mar. 23, 1990 [JP] Japan .................. 2-30321[U]

[51] Int. Cl.⁵ .................. F16C 29/06; F16C 33/72
[52] U.S. Cl. .................. 384/15; 384/45
[58] Field of Search .................. 384/15, 43–45

[56] References Cited

U.S. PATENT DOCUMENTS

| 3,400,987 | 9/1968 | Erikson | 384/15 |
| 4,850,720 | 7/1989 | Osawa | 384/15 X |
| 4,921,358 | 5/1990 | Kasuga et al. | 384/15 |

FOREIGN PATENT DOCUMENTS

| 121225 | 7/1984 | Japan | 384/15 |
| 1-178221 | 12/1989 | Japan | |

Primary Examiner—Thomas R. Hannon
Attorney, Agent, or Firm—Basile and Hanlon

[57] ABSTRACT

A linear movement guide bearing includes a guide rail and a slider straddling the guide rail for movement in an axial direction through rolling of balls interposed between the guide rail and the slider. A pair of under seals are attached to lower surfaces of the slider so that inner edges of the slide are slidably in contact with the side surfaces of the guide rail. Each under seal has elastic projection portions at axial opposite ends which protrude vertically toward the lower surface of the slider. Each elastic projection portion is formed by a forked elastic projection having two projection pieces whose free ends are expanded outwardly. Hook-like holding projections are formed on the free ends of the two projection pieces and protrude outwardly therefrom. The slider has vertical apertures formed in the lower surface for fitting the forked elastic projections thereinto and has through bores respectively formed orthogonal to the vertical apertures. When the forked elastic projection is fully fitted into the vertical apertures, the hook-like holding projections are engaged with the through bore to hold the forked elastic projection.

11 Claims, 8 Drawing Sheets

UNDER SEAL DEVICE OF LINEAR MOVEMENT GUIDE BEARING

BACKGROUND OF THE INVENTION

1. Field of the Invention

The present invention relates to an under seal device of a linear movement guide bearing used in machine tools, industrial machines, and the like.

2. Description of the Relevant Art

A prior art under seal device of a linear movement guide bearing is disclosed, for example, in Japanese Utility Model Laid-Open Publication Hei No. 1-178221. This linear movement guide bearing includes a guide rail extending in an axial direction and having ball rolling grooves respectively formed in both side surfaces, a slider main body fitted on the guide rail for movement in an axial direction and having ball rolling grooves respectively formed in inner surfaces of both side walls so that the ball rolling grooves of the slider respectively correspond to the ball rolling grooves of the guide rail, the slider main body further having through bores as ball return paths respectively formed in both of the side walls in parallel with the ball rolling grooves of the slider main body, end caps respectively joined to axial opposite ends of the slider main body, each of the end caps having a pair of semicircular-shaped curved paths each communicating a corresponding one of the ball rolling grooves with a corresponding one of the through bores, and a plurality of balls loaded in opposing ball rolling grooves of the guide rail and the slider main body, the ball return paths, and the curved paths.

In this linear movement guide bearing, each of the end caps has seal holding grooves formed in an end surface which is joined with the slider main body for holding end portions of a pair of under seals which are inserted therein. Further, the slider main body has recessed under seal accommodating portions respectively formed in the lower surfaces of both of the side walls.

On the other hand, each of the under seals includes a mandrel which abuts against the under seal accommodating portion and a rubber body bonded to the mandrel and having a lip portion extending from an outer edge of the mandrel to slidably contact a side surface of the guide rail. The rubber body further has elastic projections protruding from longitudinal opposite ends of the rubber body.

In mounting the under seal, the under seal is applied to the under seal accommodating portion of the slider main body and the opposite ends of the under seal are respectively fitted into the under seal holding grooves formed in the joining surface of the end caps with the slider main body. As a result, the elastic projections protruding from the opposite ends of the under seal are pressed against the groove surfaces of the seal holding grooves to hold the under seal in place by an elastic force. Thus, the under seal can be fixed in position by substantially a single mounting operation.

However, in such a prior art under seal device of a linear movement guide bearing, the fixing of the under seal is primarily aimed at preventing the fall off of the under seal from the slider. Thus, the wear of the under seal is not especially taken into consideration and a problem is encountered in that the sealing performance of the under seal deteriorates due to use over a long period of time.

Furthermore, in the prior art under seal of the groove fitting type, since a cut groove is formed in the end cap which is made of a synthetic resin, in the case of small-type linear movement guide bearings, there is a problem in that the thickness of the end cap for holding the under seal becomes too thin and a crack can occur in the end cap.

Furthermore, since the sealing between the under seal and side seals which are attached to outer sides of the end caps is not entirely taken into consideration, a problem develops in that the sealing performance in these portions is not sufficient.

SUMMARY OF THE INVENTION

The present invention was made in view of the problems in the prior art and it is an object of the invention to provide an under seal device which is easily mounted and demounted to and from a slider and which automatically compensates for any wear by fixing the under seal with a preload of a predetermined pressure applied thereto so as to provide sufficient strength and sealing performance.

An under seal device of the present invention is used in a linear movement guide bearing. The linear movement guide bearing includes a guide rail extending lengthwise in an axial direction and having axial rolling body rolling grooves formed in both side surfaces thereof. A slider is movably fitted on the guide rail and has rolling body rolling grooves formed in inner surfaces of the side walls thereof so that the rolling body rolling grooves of the slider respectively oppose the rolling body rolling grooves of the guide rail. The guide rail and the slider are movable in the axial direction relative to each other through the rolling of a plurality of rolling bodies inserted between the opposing rolling body rolling grooves of the guide rail and the slider. The under seal device includes a pair of under seals which are fixed to a lower surface of the slider such that the inner edge portions of the under seals are respectively slidably in contact with the outer side surfaces of the guide rail. Each of the under seals has elastic projections formed a axial opposite ends of the under seal and fitting apertures are formed in the slider which receive the elastic projections.

The elastic projections may be formed to protrude axially from the under seal and the fitting apertures may be formed in lower portions of side seals which are attached to axial opposite ends of the slider.

Furthermore, the elastic projections may be formed to protrude upwardly in an orthogonal direction with respect to an axis of the under seal. The fitting apertures may be formed by vertical apertures formed in a lower surface of the slider in the vicinity of the axial ends thereof. Further, through bores respectively orthogonal to the vertical apertures may be formed in the side wall of the slider.

Furthermore, each of the elastic projections may be formed by a forked square projection having two projection pieces. A holding portion may be provided at an end of each square projection piece.

In addition, elastic coating layers may be provided on the axial end surfaces of each of the under seals so that the elastic coating layers are in close contact with the side seals.

Furthermore, one end of the axial opposite ends of the under seal may be secured integrally with the side seal.

In the present invention, the mounting of the under seal to the slider is achieved by one fixing operation to insert the elastic projections into the fitting apertures. By forming each of the elastic projections as a forked square projection having two, elastically deformable projection pieces, any dimensional error between the elastic projection and the fitting aperture is absorbed and the fitting becomes easy. The holding portions formed at the ends of the two projection pieces of the forked square projection are held in the fitting aperture to prevent the under seal from slipping out of the slider. In demounting the under seal, a bar or the like is inserted into the fitting aperture from the side opposite from the forked projection inserting side or inserted into the through bore orthogonal to the fitting aperture s that the projection pieces are pressed and elastically deform to come close to each other to thereby release the prior holding condition. Then, the under seal can be drawn out of the slider.

When the slider having the under seals attached thereto is mounted on the guide rail, the inner edge of each under seal is pressed against a sliding surface of the guide rail and, at the same time, the elasticity of the elastic projections of the under seal generates a preload which is applied to a sliding surface of the under seal.

The elastic coating layers provided on both axial ends of the under seal function to seal the joining portions between the axial opposite ends of the under seal and the side seals.

When the fitting apertures are formed in either of the side seal, whose strength is high, or the lower surface of the slider, the strength of the end caps can be sufficiently insured. Since the attached under seal functions as a beam for supporting the lower end portions of the side seals, both of the side seals and the under seal are satisfactorily reinforced.

DESCRIPTION OF THE PREFERRED EMBODIMENTS

Figure 1:
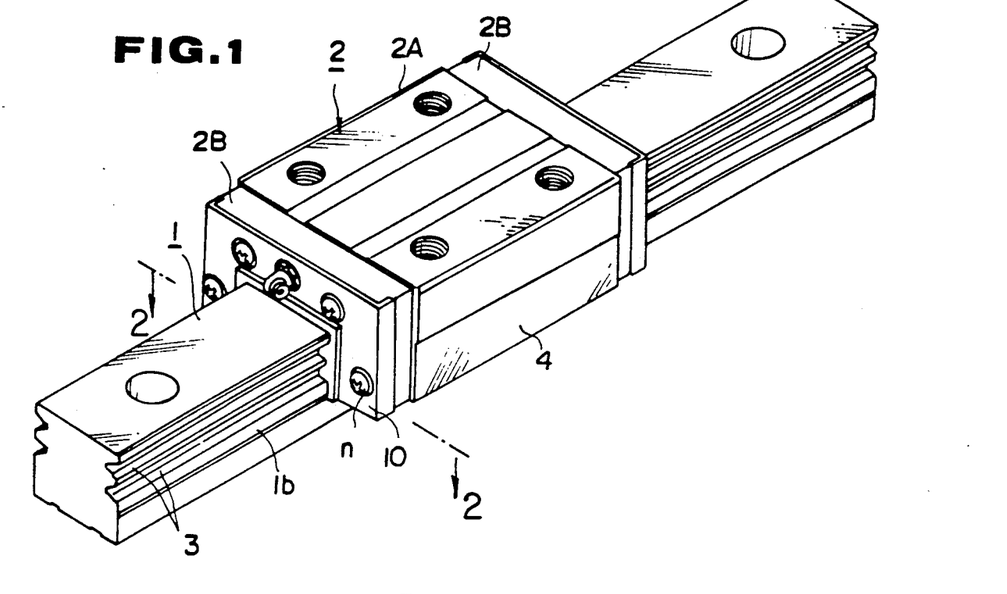
FIG. 1 is a perspective view of a linear movement guide bearing showing a first embodiment of the present invention.
Figure 2:
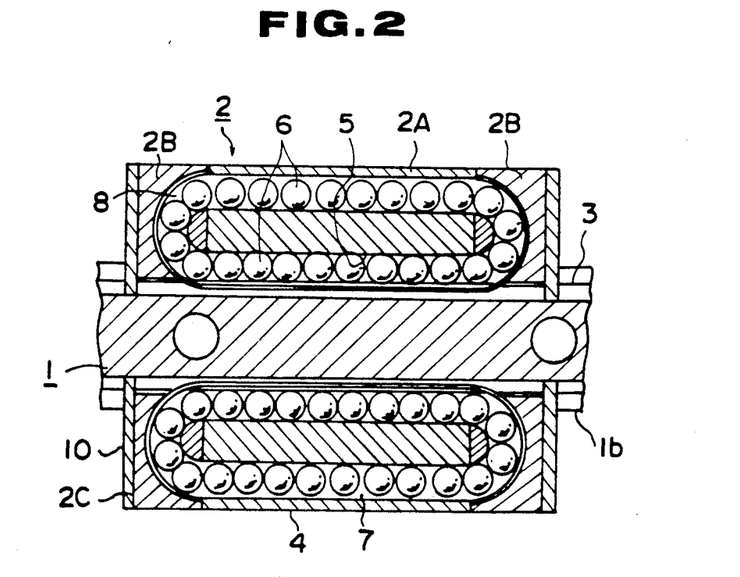
FIG. 2 is a cross sectional view taken along line 2—2 in FIG. 1.

With reference to FIGS. 1 and 2, a linear movement guide bearing to which an under seal device of the present invention is attached includes a guide rail 1 extending lengthwise in an axial direction and a slider 2 having an inverted U-shaped cross section and movably straddling the guide rail i. The guide rail 1 is fixed, for example, to a bed of a machine tool and the slider 2 is fixed to a table.

The guide rail 1 has ball rolling grooves 3 formed and extending in the axial direction in both side surfaces. A slider main body 2A of the slider 2 has ball rolling grooves 5 formed in inner surfaces of both side walls 4, as shown in FIG. 2, so that the ball rolling grooves 5 respectively correspond to the ball rolling grooves 3 of the guide rail 1. A plurality of balls 6 are rollably loaded in the opposing ball rolling grooves 3 and 5 so that the slider 2 moves in the axial direction on the guide rail 1. As the slider 2 moves relative to the guide rail 1, the balls 6 are moved while rolling to an end portion of the slider main body 2A of the slider 2. In order to enable the slider 2 to travel continuously in the axial direction, it is necessary to circulate the balls 6. Accordingly, through bores 7 are formed in both of the side walls 4 of the slider main body 2A and penetrate axially to form ball paths. At the same time, end caps 2B having a substantially inverted U-shaped cross section are positioned and fixed to axial opposite ends of the slider main body 2A. Each of the end caps 2B has U-shaped curved paths 8 formed therein so that each curved path 8 brings the through bore 7 into communication with the ball rolling grooves 3 and 5. As a result, an endless ball circulating path is formed by the through bore 7, the curved paths 8 and the ball rolling grooves 3 and 5.

When foreign particles such as dust, cuttings, chips, or the like, are deposited or disposed between the guide rail 1 and the slider 2, the smooth rolling of the balls 6 is disturbed. Accordingly, side seals 10 for preventing such foreign particles from entering through gaps at axial opposite ends of the slider 2 are respectively fixed to the outer end surfaces 2C of the end caps 2B by small screws n. Furthermore, a pair of under seals 11, FIG. 3, are fixed to the lower surfaces of the slider 2 to prevent any foreign particles from entering through the gaps between the slider 2 and side surfaces 1b of the guide rail 1 and to seal the gaps.

Figure 3:
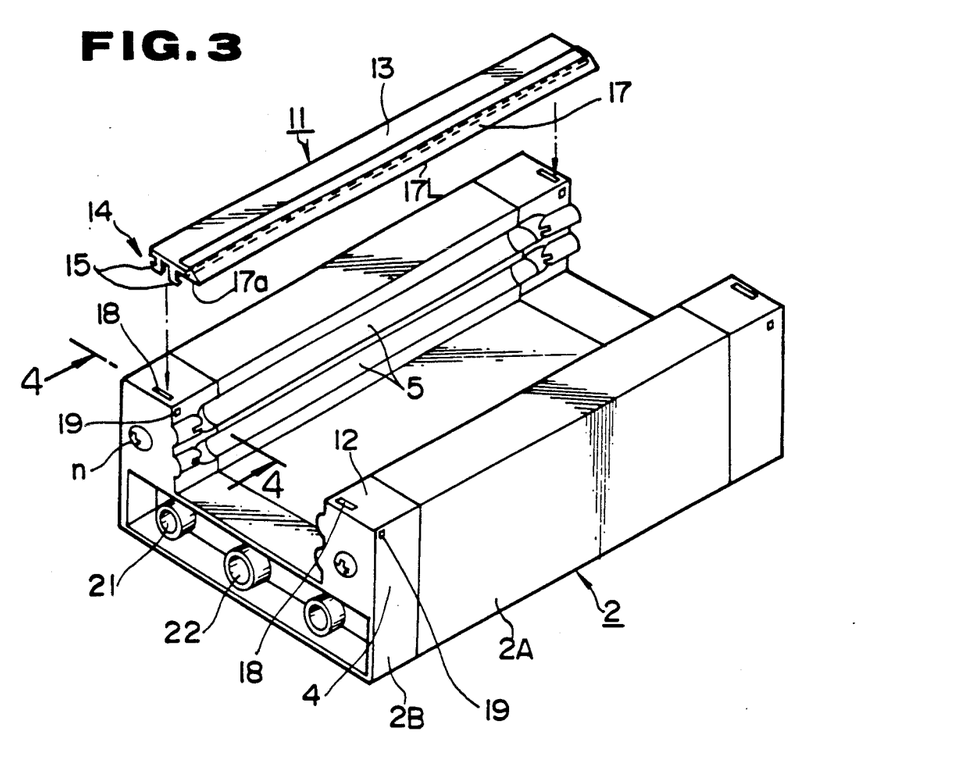
FIG. 3 is a disassembled perspective view of the slider shown in FIG. 1 as viewed from the lower surface side.
Figure 4:
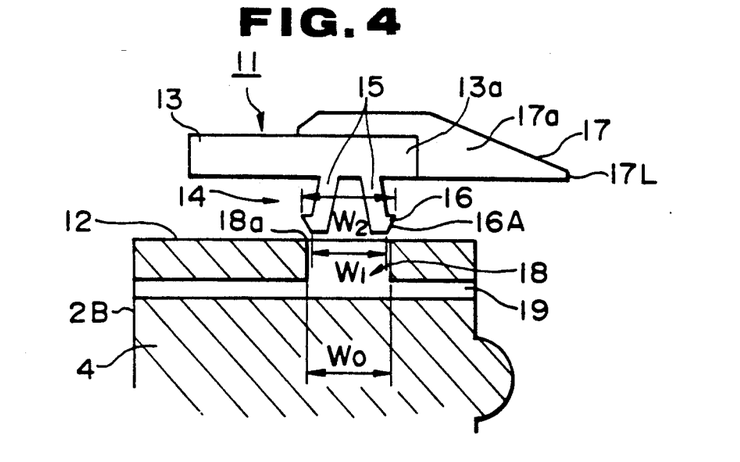
FIG. 4 is a cross sectional view generally taken along line 4—4 in FIG. 3.

FIG. 3 is a perspective view of the slider 2 as viewed from the lower side thereof, with the side seals and the balls being omitted. Each of the under seals 11 is formed of a suitable material, such as a metal or a plastic, and has a mandrel 13 formed in a strip shape which has substantially the same length as the slider 2. Fixing portions 14 are respectively provided at axial opposite ends of the mandrel 13. The fixing portion 14, as shown in FIG. 4, has a forked square projection 15 having two square projection pieces (or legs) which expand laterally and outwardly in an inverted V shape and which are elastically deformable so as to be able to move close to each other. The square projection 15 protrudes in a direction orthogonal (towards the lower surface 12 of the slider 2) to the mandrel 13. Each of the two projection pieces of the square projection 15 has a hook-like holding projection 16, FIG. 4, which extends outwardly and which has a slant surface 16A at an outer side surface.

Figure 5:
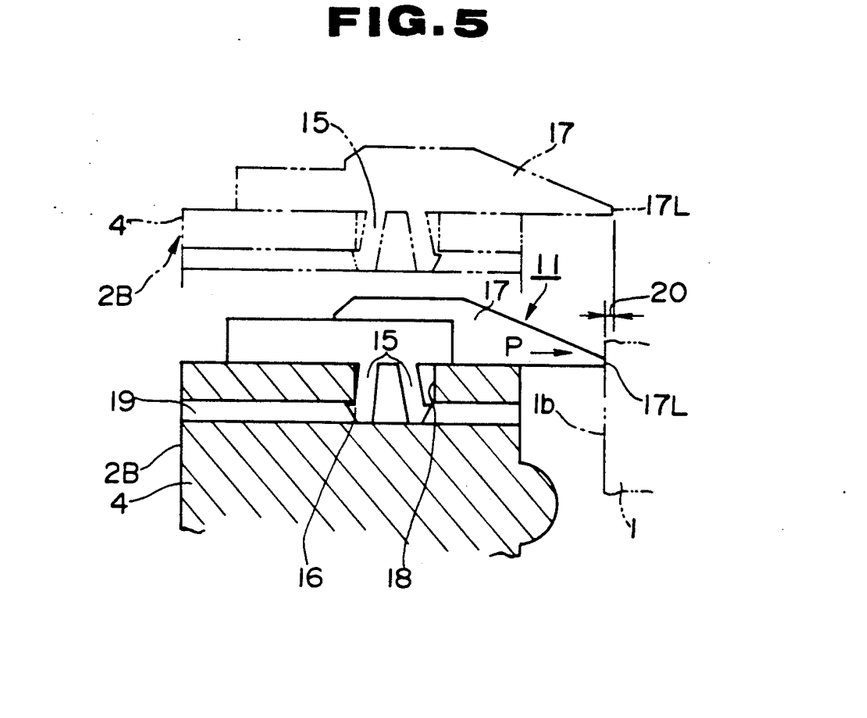
FIG. 5 is a cross sectional view of a main part showing a preloaded condition of the under seal.

A seal member 17 formed of an elastic material, such as a rubber material, a synthetic resin, or the like, is secured by baking, or the like, to an inner edge of the mandrel 13. The seal member 17 has a tapered lip portion 17L formed along the inner edge of the seal member 17 so that the lip portion 17L is slidably in contact with the side surface 1b of the guide rail 1 as shown in FIG. 5. In this embodiment, each of axial end faces 17a of the seal member 17 is aligned or flush with an end face 13a of the mandrel 13.

On the other hand, a vertical aperture 18 and a through bore 19 are formed in the lower surfaces of the slider 2, that is, in each of the lower surfaces 12 of the side walls of the end cap 2B. The vertical aperture 18 serves as a fitting aperture into which the square projection 15 is fitted. The through bore 19 is orthogonal to the vertical hole 18 and laterally penetrates the side wall 4 of the end cap 2B.

The vertical aperture 18 is rectangular in shape and has a hole width size $W_0$ which opens in the lower surface 12 and is slightly larger than an end width size $W_1$ between the ends of the expanded projection pieces of the square projection 15. The aperture width size $W_0$ is formed smaller than a maximum outer width size $W_2$ between the holding projections 16 of the square projection 15 ($W_1 < W_0 < W_2$). The depth of the vertical aperture 18 is made to allow the square projection 15 to be completely inserted therein.

The through bore 19 is square in shape and has a lateral cross section size to allow the holding projection 16 together with the slant surface 16A to be accommodated therein. The through bore 19 opens at the inner side surface and the outer side surface of the side wall 4 of the end cap 2B.

When the under seal 11 is fixed to the side walls 4 of the end cap 2B, if the square projection 15 which is fitted into the vertical aperture 18 is in a condition as shown in FIG. 5 by chain lines in which the projection pieces of the square projection 15 are opened in the inverted V shape, the position of the vertical aperture 18 in a width direction is set so that the seal lip 17L protrudes further inwardly beyond the position of the side surface 1b of the guide rail 1. By virtue of this arrangement, when the seal lip 17L is slidably in contact with the side surface 1b of the guide rail 1, the under seal 11 retreats or moves outwardly by a preload amount 20 and one projection piece (the left hand one in FIG. 5) of the square projection 15 is elastically deformed within the vertical aperture 18 as shown in FIG. 5 by solid lines. Thus, the elastic restoration force urges the under seal 11 towards the side surface 1b of the guide rail 1 so that a preload force P is applied to the seal lip 17L.

In FIG. 3, reference number 21 denotes an inserting bore of a screw for fixing a side seal (not shown) and the end cap 2B to the slider main body 2A. Reference number 22 denotes a grease nipple fixing bore.

The under seal 11 is mounted according to the following procedure.

Figure 6:
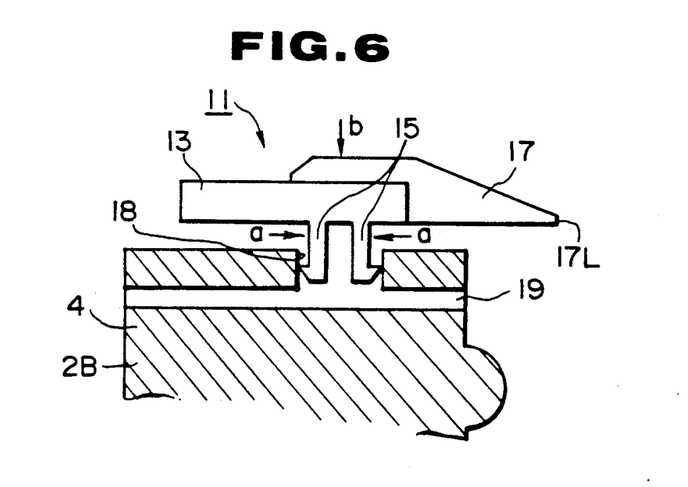
FIGS. 6 and 7 are cross sectional views of a main part illustrating a fixing operation of the under seal.
Figure 7:
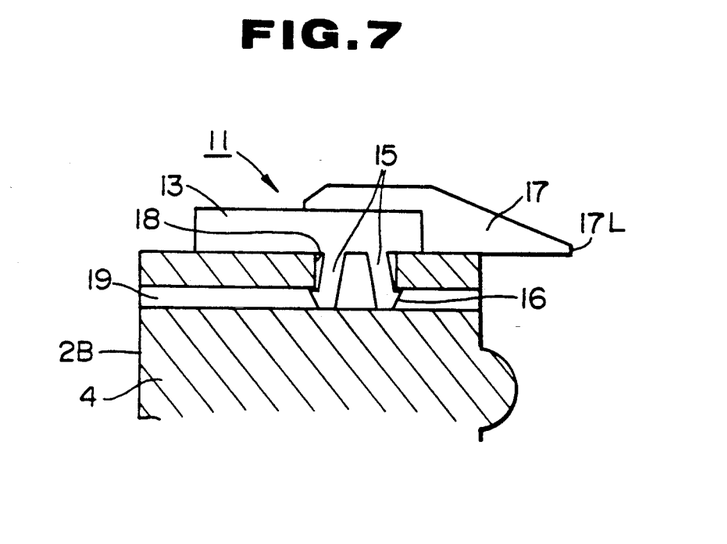

When the square projection 15 of the under seal 11 is inserted into the vertical aperture 18 from a position shown in FIG. 4, the slant surfaces 16A at the tip ends of the projection pieces of the square projection 15 are pressed inwardly by the opening edges 18a of the vertical aperture 18 and the projection pieces of the square projection 15 are elastically deformed inwardly from the opened condition, that is, in the directions shown by the arrows a in FIG. 6. As a result, the outer width size $W_2$ of the hook-like holding projections 16 is reduced and the square projection 15 is allowed to be further inserted into the vertical aperture 18, easily passing through the vertical aperture 18 having a width size $W_0$ as the under seal 11 is pressed in the direction of arrow b. When the holding projections 16 of the square projection 15 reach the position of the lateral through bore 19, the holding projections 16 are engaged with the through bore 19 and, as shown in FIG. 7, the square projection 15 opens or expands outward by an elastic force in the inverted V shape and returns to the original outer width size $W_2$. In this manner, the under seal 11 can be quickly and easily mounted by a single operation.

The slider 2 having the under seals 11 mounted thereto is then assembled to the guide rail 1. Then, the seal lip 17L of each under seal 11 is depressed by the side surface 1b of the guide rail 1 and retreats outwardly by the preload amount 20. As a result, one of the projection pieces of the square projection 15 which is fitted into the vertical aperture 1 is elastically deformed within the vertical aperture 18, as described above and shown in FIG. 5, and the seal lip 17L is loaded with the preload force P by the elastic restoration force. Therefore, even when the seal lip 17L is worn due to repetitive sliding movement on the side surface 1b of the guide rail 1, the worn portion is compensated for by the preload P and degrading of the sealing property can be prevented for a long period of time.

Figure 8:
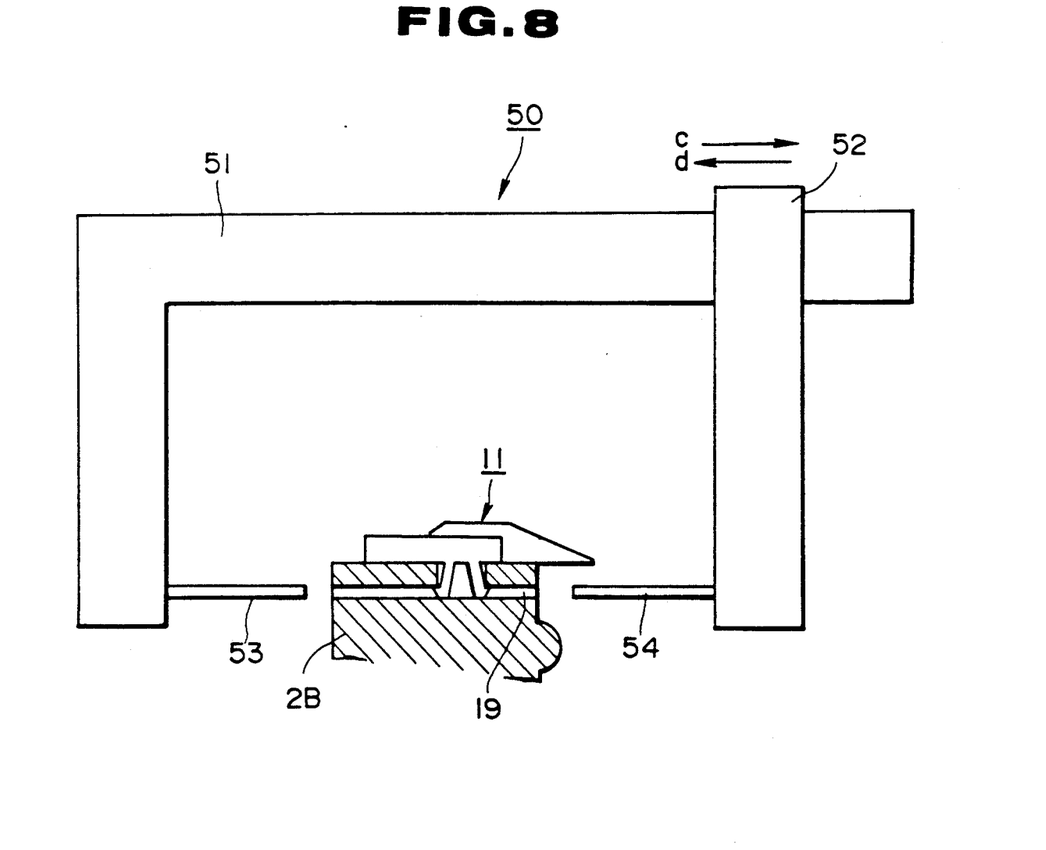
FIG. 8 is a schematic view showing a mounting-demounting jig and its action.

In demounting the under seal 11, a demounting jig 50 shown in FIG. 8 is used. An L-shaped arm 51 is attached to a slidable arm 52, which is slidable in the directions of the arrows c and d, and pressing bars 53 and 54 opposing each other are fixed to the ends of both of the arms 51 and 52. The thicknesses of the pressing bars 53 and 54 are selected so that the bars 53 and 54 can be inserted into the through bore 19 of the end cap 2B. The bars 53 and 54 are inserted into the through bore 19 of the slider 2 which has been disassembled from the guide rail 1 so that the slant surfaces 16A at the ends of the projection piece of the square projection 15 which is opened in the inverted V shape are pressed inwardly from both directions by the bars 53 and 54. Thus, the projection pieces of the square projection 15 are elastically deformed in a direction to close the forked square projection 15. Thereafter, the under seal 11 is pulled so as to draw out the square projection 15 from the vertical aperture 18.

In this embodiment, since the square projection 15 is structured to be elastically deformable, a dimensional error between the fixing portion 14 of the under seal 11 and the vertical aperture 18 of the end cap 2B can be easily absorbed.

Furthermore, although the holding projection 16 of the square projection 15 is formed in a hook shape, it is not limited to this shape, and the holding projection 16 may also be formed in a circular arc shape.

In addition, although the axial end face 17a of the seal member 17 is made flush with the end face 13a of the mandrel 13, when the end face 17a of the seal member 17 is made to cover the end face 13a of the mandrel 13, the end face 17a of the seal member 17 functions as an elastic coating layer for sealing a portion which is jointed with a side seal (not shown) such that the sealing performance of the under seal 11 can be improved.

The seal lip 17L at the inner edge of the under seal 11 which is secured to the slider 2 is slidably in contact with the side surface 1b of the guide rail 1 so that the sealing of the under side of the slider 2 is achieved.

Figure 9:
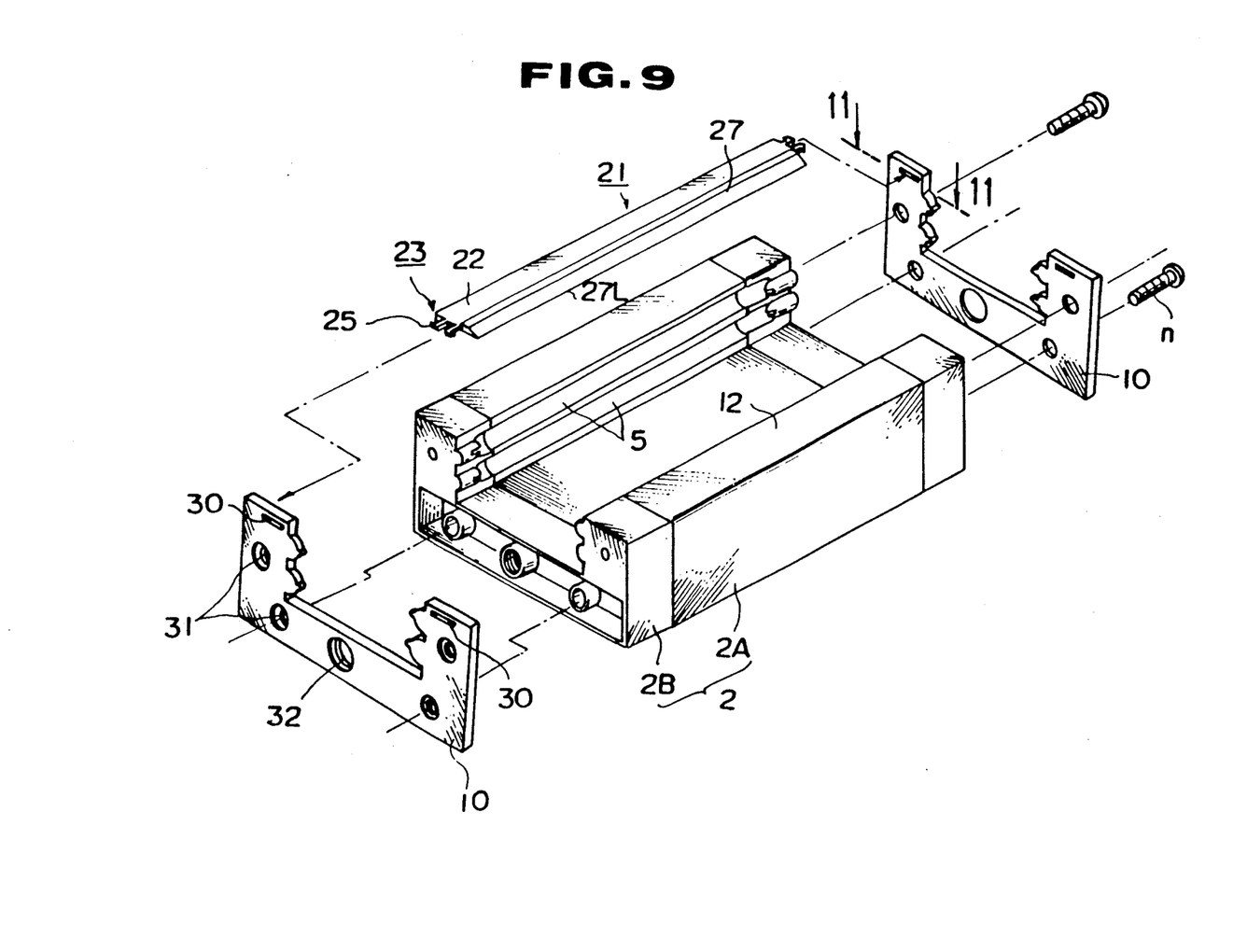
FIG. 9 is a disassembled perspective view of a slider of a second embodiment of the invention as viewed from the lower surface side.

FIG. 9 shows a second embodiment of the present invention.

Figure 10:
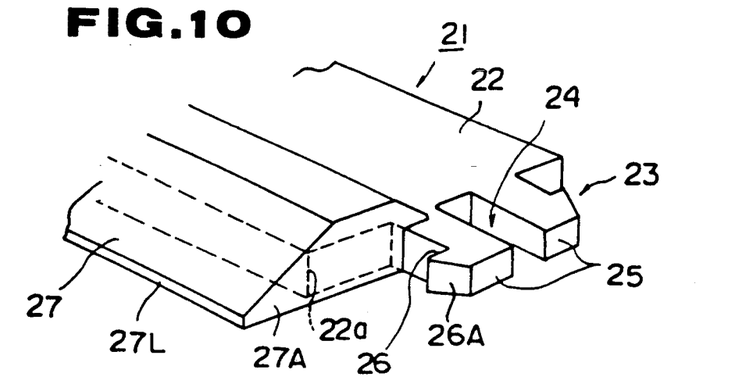
FIG. 10 is an enlarged perspective view of a main part of the under seal shown in FIG. 9.

An under seal 21 includes a mandrel 22 formed of a material having a large strength, such as a steel or a plastic. The mandrel 22 is of a strip shape of substantially the same length as the slider 2. Projection portions 23 extending in an axial direction are formed at axial opposite ends of the mandrel 22. Each of the projection portions 23 has a forked square projection 25, as shown in FIG. 10. The forked square projection 25 is divided into two projection pieces (legs) spaced from each other by a dividing groove 24. The projection pieces of the square projection 25 are elastically deformable to move close to and away from each other. Hook-like holding portions 26 having slant surfaces 26A are provided at the ends of the projection pieces of the square projection 25. In FIG. 10, although the projection pieces of the square projection 25 are formed in parallel with each other, when the projection pieces are formed in an inverted V shape so that the ends are slightly opened from a base portion it is still easy to apply a preload.

A seal member 27 formed of a rubber material, a synthetic material, or the like, is secured to an inner edge of the mandrel 22 by baking, or the like, and a tapered seal lip 27L of the seal member 27 is made to slidably contact a side surface 1b of the guide rail 1. In the seal member 27 shown in FIG. 10, each of axial ends of the seal member 27 extends slightly beyond an end face 22a of the mandrel 22 to form an elastic coating layer 27A which covers or coats a base portion of one of the projection pieces of the square projection 25. Thus, the sealing function of a joining portion with a side seal 10 is enhanced.

Figure 11:
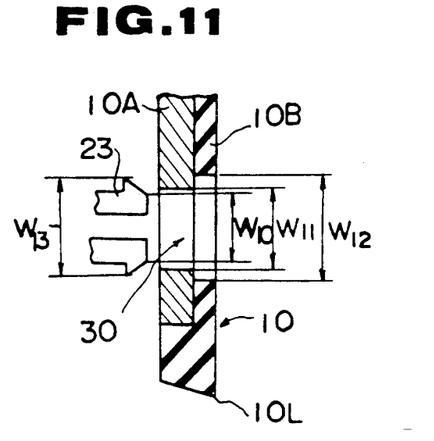
FIG. 11 is a cross sectional view of a main part generally taken along line 11—11 in FIG. 9.

On the other hand, the side seal 10 includes a mandrel 10A made of steel and having an inverted U-shape. The mandrel 10A is also coated with a rubber elastic material 10B. The rubber coating on an inner surface which is slidably in contact with the guide rail 1 is made thick and an end portion having an acute angle constitutes a seal lip 10L as shown in FIG. 11. A fitting aperture 30 into which the projection portion 23 of the under seal 21 is fitted is formed in the side seal 10 at a position near a lower end of each side wall of the side seal 11. An aperture width size $W_{11}$ at the mandrel 10A side (inserting side of the under seal) of the fitting aperture 30, as shown in FIG. 11, is slightly larger than an end width $W_{10}$ of the projection portion 23 of the under seal 21. The aperture width size $W_{12}$ at the coating side of the rubber elastic material 10B is formed slightly larger than an outer width size $W_{13}$ of the hook-like holding portion 26 of the projection portion 23. In this respect, the aperture width size $W_{12}$ at the coating side of the rubber elastic material 10B may be formed equal in size with the aperture width size $W_{11}$ at the mandrel 10A side. In this case, when the projection portion 23 of the under seal 21 is fitted into the fitting aperture 30, the extreme ends of the square projection 25 protrude from an outer surface of the under seal 21.

Furthermore, in FIG. 9, reference number 31 denotes an inserting bore for a small screw for fixing the side seal 10 to the end cap 2B and reference number 32 denotes a grease nipple attaching bore.

The mounting of the under seal 21 is performed according to the following procedure. In this operation, the slider 2 may be assembled to the guide rail 1 in advance with the under seals 10 not attached to the slider 2.

One of the projection portions 23 at one axial end of the under seal 21 is inserted, as shown in FIG. 9, into the fitting aperture 30 of one side seal 10 and the other of the projection portions 23 at the other axial end of the under seal 21 is inserted into the fitting aperture 30 of the other side seal to mount the under seal 21 to the slider 2. When the projection portion 23 is inserted into the fitting aperture 30, the slant surfaces 26A of the forked square projection 25 are pressed inwardly by the opening edges of the fitting aperture 30 and the projection pieces of the forked square projection 25 are elastically deformed to move close to each other. As a result, the outer width size $W_{13}$ of the hook-like holding portion 26 is reduced and the hook-like holding portion 26 can easily pass through the fitting aperture 30 having an aperture width size $W_{11}$. When the holding portion 26 reaches the position of the aperture width size $W_{12}$ in FIG. 11, the hook-like holding portion 26 returns by elasticity to its original outer width size $W_{13}$ and is engaged with and held by the step portions of the fitting aperture 30. Thus, the under seal 21 is prevented from falling off of the slider 2. In this manner, the under seal 21 is mounted to the slider 2 simply and quickly in a single operation.

One of the side seals 10 may be fixed to the slider 2 beforehand and the under seal 21 may be fixed to the slider 2 after the opposite ends are respectively fitted into the side seals 10.

In this embodiment, since the projection portion 23 is formed by the elastically deformable forked square projection 25, a dimensional error between the projection portion 23 and the fitting hole 30 can be easily absorbed.

Figure 12:
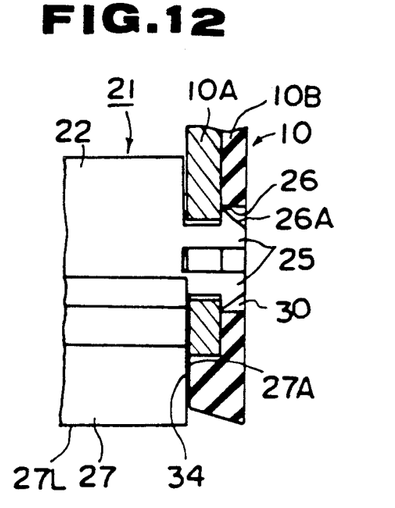
FIG. 12 shows a partial, cross sectioned view depicting a coupled condition of the parts of the under seal and the side seal shown in FIG. 11.

Furthermore, since the seal member 27 of the under seal 21 coats the axial end faces 22a of the mandrel 22 with a thin elastic coating layer 27A, as shown in FIG. 12, the joining portion 34 of the side seal 10 can be completely sealed.

Furthermore, since the under seal 21 includes the mandrel of a steel plate having a high strength and the under seal 21 is assembled to the side seal 10 having the fitting aperture 30, the under seal 21 performs not only the dust sealing function; but, also, a beam function which reinforces the side seals 10 at opposite ends of the slider 2. Thus, the rigidity of the side seal 10 is enhanced and sealing reliability is improved.

Furthermore, when the square projection 25 is formed in the inverted V shape, as described in the first embodiment (FIG. 5), one of the projection pieces of the square projection 25 is elastically deformed within the fitting aperture 30 and a large preload can be loaded by the elastic restoration force of the square projection 25 through the seal lip 27L. Thus, the sealing performance can be insured for a long time period.

When demounting the under seal 21, a pressing means, such as a bar of the like, is inserted from the outer side of the fitting aperture 30 to inwardly pres the slant surfaces 26A of the forked square projection 25 so that both the slant surfaces 26A move close to each other to thereby reduce the outer width size $W_{13}$ of the hook-like holding portion 26. Thus, the hook-like holding portion 26 is allowed to pass through the fitting aperture 30 of an aperture width size $W_{11}$ so that the under seal 21 can be drawn out of the slider 2. As a result, the replacement of the under seal 21 can be achieved very easily.

Figure 13:
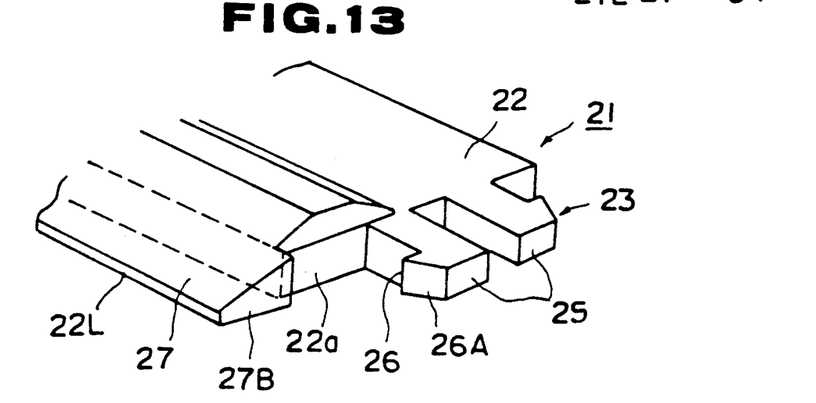
FIG. 13 is an enlarged perspective view of a main part of the under seal of a third embodiment of the invention.

FIG. 13 shows a third embodiment of the present invention. Axial end portions of a seal member 27 of the under seal 21, which portions coat a mandrel 22, axially extend slightly beyond the end faces 22a of the mandrel 22. The end faces 27B of the extending portions function as elastic coating layers for sealing the joining portions 34 with the side seal 10.

Figure 14:
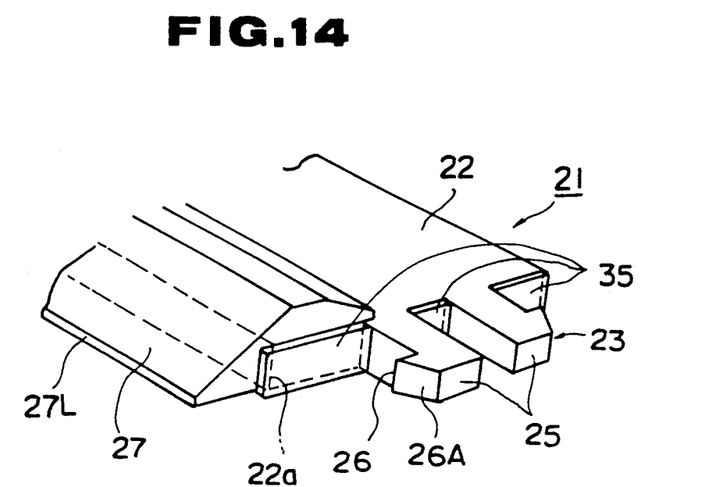
FIG. 14 is an enlarged perspective view of a main part of the under seal of a fourth embodiment of the invention.

FIG. 14 shows a fourth embodiment of the present invention. Axial ends of a seal member 27 of the under seal 21 are substantially in alignment with the end faces 22a of a mandrel 22. However, seal pieces 35 made of a rubber elastic material are bonded to the end faces 22a of the mandrel 22. The seal pieces 35 seal the joining portions 34 with the side seals 10 as elastic coating layers.

Figure 15:
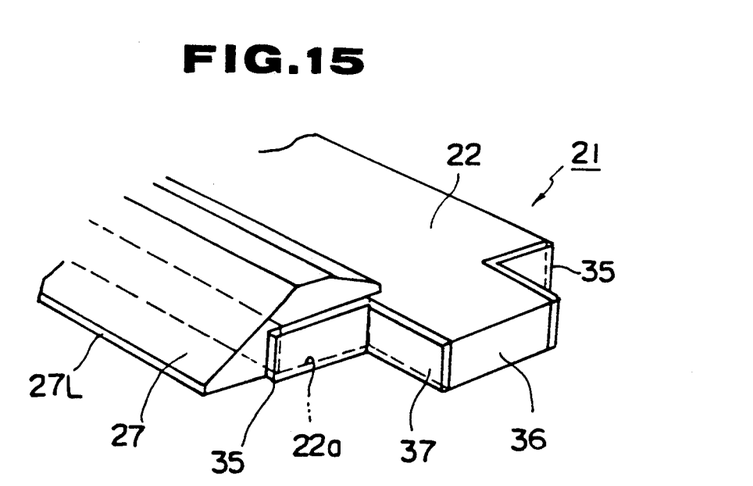
FIG. 15 is an enlarged perspective view of a main part of the under seal of a fifth embodiment of the invention.

FIG. 15 shows a fifth embodiment of the present invention. Each of the projections of the mandrel 21 of the under seal 21 is formed as a single rectangular projection 36 instead of the forked projection. Elastic pieces 37 made of a rubber or a synthetic resin are bonded to side surfaces of the rectangular projection 36. The elastic pieces 37 absorb a dimensional error between the rectangular projection 36 and the fitting aperture 30 of the side seal 10 to make the fitting easy.

Figure 16:
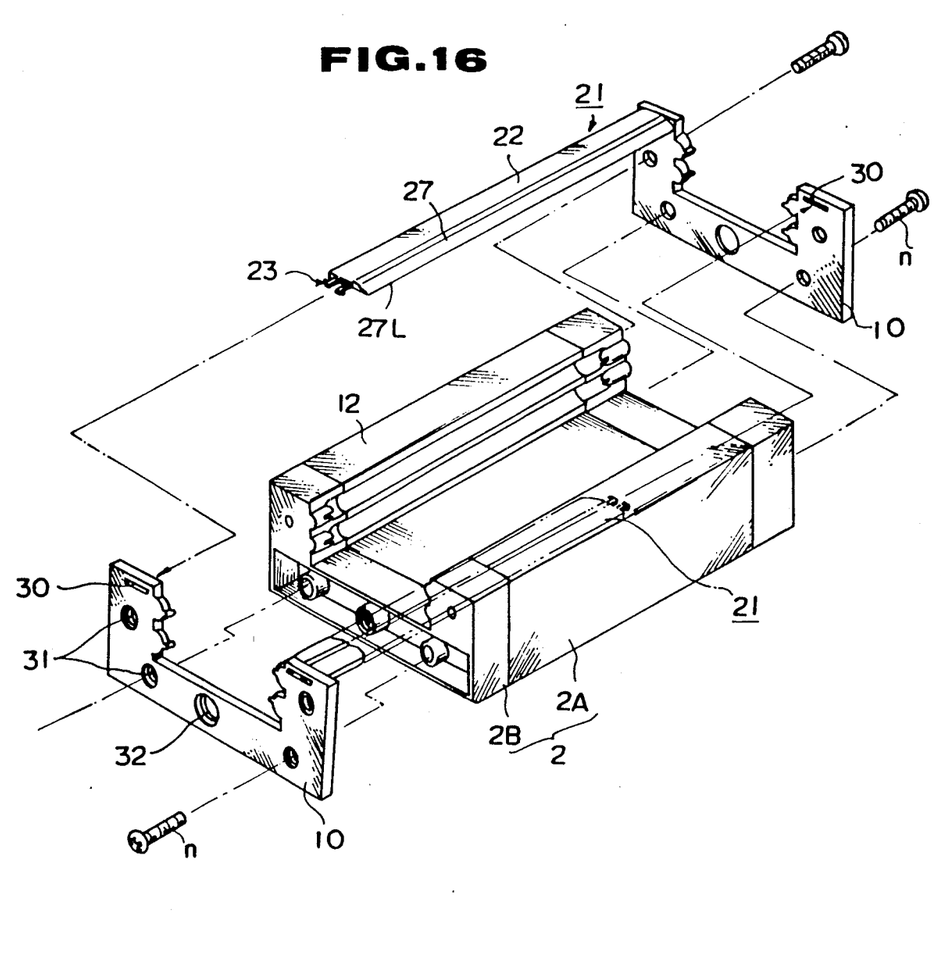
FIG. 16 is a disassembled perspective view of a slider of a sixth embodiment of the invention as viewed from the lower surface side.

FIG. 16 shows a sixth embodiment of the present invention. In this embodiment, one axial end of an under seal 21 is integrally secured to a side seal 10. The structure of the other end of the under seal 21 may be the same as that in each embodiment described above. In replacing the under seal 21, the side seal 10 which is integral with the under seal 21 is replaced together with the under seal 21. As compared with the type of the under seal which is attached to the side seals 10 by fitting, an advantage is provided in that the reinforcing function of the under seal 21 is improved.

In each of the second to sixth embodiments, the under seal 21 is fixed by the side seals 10. As a result, the under seal 21 is also able to seal the outer end portions of the end caps 2B such that the sealing performance is improved.

Each of the embodiments is described as to the case in which the under seal device is applied to the linear movement guide bearing which has two rows of rolling body rolling grooves in each side of the guide rail and in each inner surface of the side walls of the slider. However, the under seal device can be applied to other types of linear movement guide bearings. Furthermore, the rolling body may be a ball and a roller.

In the under seal device of the linear movement guide bearing of the present invention, the under seals are respectively mounted to the lower surfaces of the slider so that the under seals are slidably in contact with the side surfaces of the guide rail. Each of the under seals has elastic projections formed at axial opposite ends which fit into fitting apertures formed in the slider. As a result, an advantage is provided in that it is possible to mount the under seal with a preload applied thereto. Thus, the mounting and demounting of the under seal are very easy and wear can be compensated for automatically. Furthermore, since the side seal is coupled to a member which had a high rigidity, sufficient strength is insured and the under seal device having sufficient strength and sealing performance can be provided.

What is claimed is:

1. An under seal device of a linear movement guide bearing having a guide rail extending in an axial direction and rolling body rolling grooves respectively formed in side surfaces thereof, a slider movably fitted on the guide rail and having rolling body rolling grooves respectively formed in inner surfaces of side walls thereof so that the rolling body rolling grooves of the slider respectively oppose the rolling body rolling grooves of the guide rail, the guide rail and the slider being relatively movable in the axial direction through a plurality of balls inserted in the opposing rolling body rolling grooves, the under seal device comprising:

a pair of under seals mounted to lower surfaces of the slider respectively in the vicinity of lower side edges of the slider so that inner edges of the under seals are slidably in contact with the side surfaces of the guide rail;

elastic projection portions respectively formed at axial opposite ends of each of the pair of under seals; and fitting apertures formed in the lower surfaces of the slider at positions corresponding to the elastic projection portions of the pair of under seals so that each of the elastic projection portions is fitted into a corresponding one of the fitting apertures;

wherein the elastic projection portions protrude axially from each under seal, the slider includes a pair of side seals respectively attached to axial opposite ends of the slider, and the fitting apertures are formed in lower portions of the pair of side seals.

2. The under seal device according to claim 1 wherein each of the under seals has elastic coating layers respectively formed on axial opposite end surfaces, the elastic coating layers being in close contact with the side seals.

3. The under seal device according to claim 2 wherein one axial end of each of the under seals is integrally secured to a corresponding one of the side seals.

4. The under seal device according to claim 1 wherein one axial end of each of the under seals is integrally secured to a corresponding one of the side seals.

5. The under seal device according to claim 1 wherein each of the elastic projection portions is a forked square projection having two projection pieces, and holding portions are formed respectively on the two projection pieces of the forked square projection.

6. The under seal device according to claim 5 wherein the holding portions of the two projection pieces have at least one of an outwardly protruding hook shape and an outwardly protruding circular arc shape.

7. An under seal device of a linear movement guide bearing having a guide rail extending in an axial direction and rolling body rolling grooves respectively formed in side surfaces thereof, a slider movably fitted on the guide rail and having rolling body rolling grooves respectively formed in inner surfaces of side walls thereof so that the rolling body rolling grooves of the slider respectively oppose the rolling body rolling grooves of the guide rail, the guide rail and the slider being relatively movable in the axial direction through a plurality of balls inserted in the opposing rolling body rolling grooves, the under seal device comprising:

a pair of under seals mounted to lower surfaces of the slider respectively in the vicinity of lower side edges of the slider so that inner edges of the under seals are slidably in contact with the side surfaces of the guide rail;

elastic projection portions respectively formed at axial opposite ends of each of the pair of under seals; and fitting apertures formed in the lower surfaces of the slider at positions corresponding to the elastic projection portions of the pair of under seals so that each of the elastic projection portions is fitted into a corresponding one of the fitting apertures;

wherein the elastic projection portions of each under seal protrude upwardly in a direction orthogonal to the longitudinal axis of the under seal, the slider includes a pair of end caps respectively attached to axial opposite ends of the slider, the fitting apertures are formed vertically in lower surfaces of the pair of end caps, and a through bore is formed orthogonal to each of the fitting apertures, the through bore laterally penetrating a side wall of the end cap.

8. The under seal device according to claim 7 wherein each of the elastic projection portions is a forked square projection having two projection pieces, and holding portions are formed respectively on the two projection pieces of the forked square projection.

9. The under seal device according to claim 8 wherein the holding portions of the two projection pieces have at least one of an outwardly protruding hook shape and an outwardly protruding circular arc shape.

10. An under seal device of a linear movement guide bearing having a guide rail extending in an axial direction and rolling body rolling grooves respectively formed in side surfaces thereof, a slider movably fitted on the guide rail and having rolling body rolling grooves respectively formed in inner surfaces of side walls thereof so that the rolling body rolling grooves of the slider respectively oppose the rolling body rolling grooves of the guide rail, the guide rail and the slider being relatively movable in the axial direction through a plurality of balls inserted in the opposing rolling body rolling grooves, the under seal device comprising:

a pair of under seals mounted to lower surfaces of the slider respectively in the vicinity of lower side edges of the slider so that inner edges of the under seals are slidably in contact with the side surfaces of the guide rail;

elastic projection portions respectively formed at axial opposite ends of each of the pair of under seals; and fitting apertures formed in the lower surfaces of the slider at positions corresponding to the elastic projection portions of the pair of under seals so that each of the elastic projection portions is fitted into a corresponding one of the fitting apertures;

wherein each of the elastic projection portions is a forked square projection having two projection pieces, and holding portions are formed respectively on the two projection pieces of the forked square projection.

11. The under seal device according to claim 10 wherein the holding portions of the two projection pieces have at least one of an outwardly protruding hook shape and an outwardly protruding circular arc shape.

* * * * *